US012407143B2

(12) United States Patent
Kerstetter

(10) Patent No.: US 12,407,143 B2
(45) Date of Patent: Sep. 2, 2025

(54) TOOL FOR A CONNECTOR ASSEMBLY

(71) Applicant: TE Connectivity Solutions GmbH, Schaffhausen (CH)

(72) Inventor: Chadwick Alan Kerstetter, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 465 days.

(21) Appl. No.: 18/060,047

(22) Filed: Nov. 30, 2022

(65) Prior Publication Data

US 2024/0178627 A1 May 30, 2024

(51) Int. Cl.

| | |
|---|---|
| ***H01R 4/00*** | (2006.01) |
| ***H01R 4/18*** | (2006.01) |
| ***H01R 12/53*** | (2011.01) |
| ***H01R 43/042*** | (2006.01) |

(52) U.S. Cl.
CPC .......... *H01R 43/042* (2013.01); *H01R 4/183* (2013.01); *H01R 12/53* (2013.01)

(58) Field of Classification Search
CPC ................................ H01R 4/183; H01R 12/53
See application file for complete search history.

(56) References Cited

U.S. PATENT DOCUMENTS

| | | | | |
|---|---|---|---|---|
| 4,932,091 A * | 6/1990 | Krzyzanski | H01R 43/042 | 30/90.1 |
| 5,704,674 A * | 1/1998 | Boozer | B25J 15/0608 | 294/174 |
| 5,797,177 A * | 8/1998 | Simmons | H01R 43/205 | 29/739 |
| 6,113,679 A * | 9/2000 | Adkins | C09D 11/36 | 106/31.89 |
| 6,949,700 B1 * | 9/2005 | Kelly | G10D 3/173 | 84/322 |
| 7,641,499 B1 * | 1/2010 | George | B60L 3/0069 | 439/352 |
| 2019/0350813 A1 * | 11/2019 | Omura | G07F 11/66 | |

* cited by examiner

*Primary Examiner* — Phuong Chi Thi Nguyen

(57) ABSTRACT

A tool for a connector assembly includes a crimp head having a tool housing and a ram assembly disposed within the tool housing, the ram assembly has a connector ram and a shield ram disposed within the connector ram. The tool includes a driving portion driving movement of the ram assembly with respect to the tool housing from a retracted position to a terminated position along a longitudinal direction. The connector ram and the shield ram are movable together with respect to the tool housing from the retracted position to an intermediate position between the retracted position and the terminated position. The shield ram is movable with respect to the connector ram from the intermediate position to the terminated position of the ram assembly.

20 Claims, 11 Drawing Sheets

TOOL FOR A CONNECTOR ASSEMBLY

FIELD OF THE INVENTION

The present invention relates to a terminating assembly including a tool used for terminating a connector assembly.

BACKGROUND

A wire is often electrically connected to a printed circuit board (PCB) by a connector disposed on the PCB. The connector is commonly soldered to the PCB. The wire is inserted into the connector and, in insulation displacement contact applications, the connector is terminated by pressing a cover of the connector toward the PCB. The cover presses the wire against a contact in the connector to electrically connect the wire with the contact and, through the solder joint, with the PCB.

The insertion force required to displace the cover of the connector and terminate the wire is commonly dispersed to the PCB. The force reaching the PCB, however, can lead to damage of the solder joint between the connector and the PCB, impairing the electrical connection to the PCB. Further, terminating the wire in the connector by pressing the cover either manually or with existing tools is inefficient and increases production costs.

SUMMARY

A tool for a connector assembly includes a crimp head having a tool housing and a ram assembly disposed within the tool housing, the ram assembly has a connector ram and a shield ram disposed within the connector ram. The tool includes a driving portion driving movement of the ram assembly with respect to the tool housing from a retracted position to a terminated position along a longitudinal direction. The connector ram and the shield ram are movable together with respect to the tool housing from the retracted position to an intermediate position between the retracted position and the terminated position. The shield ram is movable with respect to the connector ram from the intermediate position to the terminated position of the ram assembly.

BRIEF DESCRIPTION OF THE DRAWINGS

The invention will now be described by way of example with reference to the accompanying Figures, of which.

DETAILED DESCRIPTION OF THE EMBODIMENTS

Figure 1:
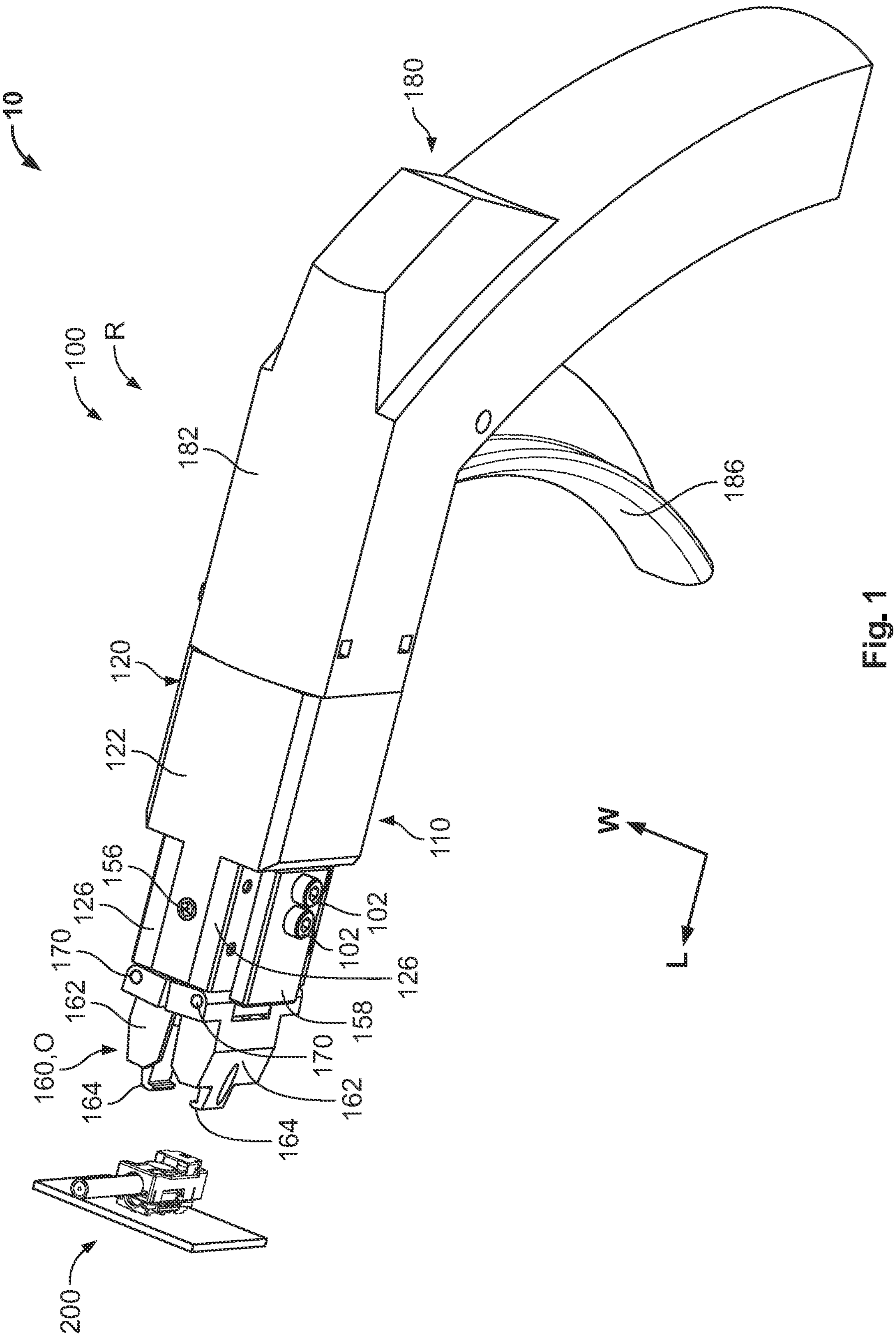
FIG. 1 is a perspective view of a terminating assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as “longitudinal” and “width”. These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A terminating assembly 10 according to an embodiment, as shown in FIG. 1, includes a tool 100 and a connector assembly 200. The tool 100, as described in detail below, is used to terminate the connector assembly 200.

As shown in FIG. 1, the tool 100 includes a crimp head 110 and a driving portion 180 attached to the crimp head 110 and driving movement of the crimp head 110. The crimp head 110, as shown in FIGS. 1-3, includes a tool housing 120, a ram assembly 130 disposed within the tool housing 120, and a clamp assembly 160 attached to the tool housing 120.

Figure 2:
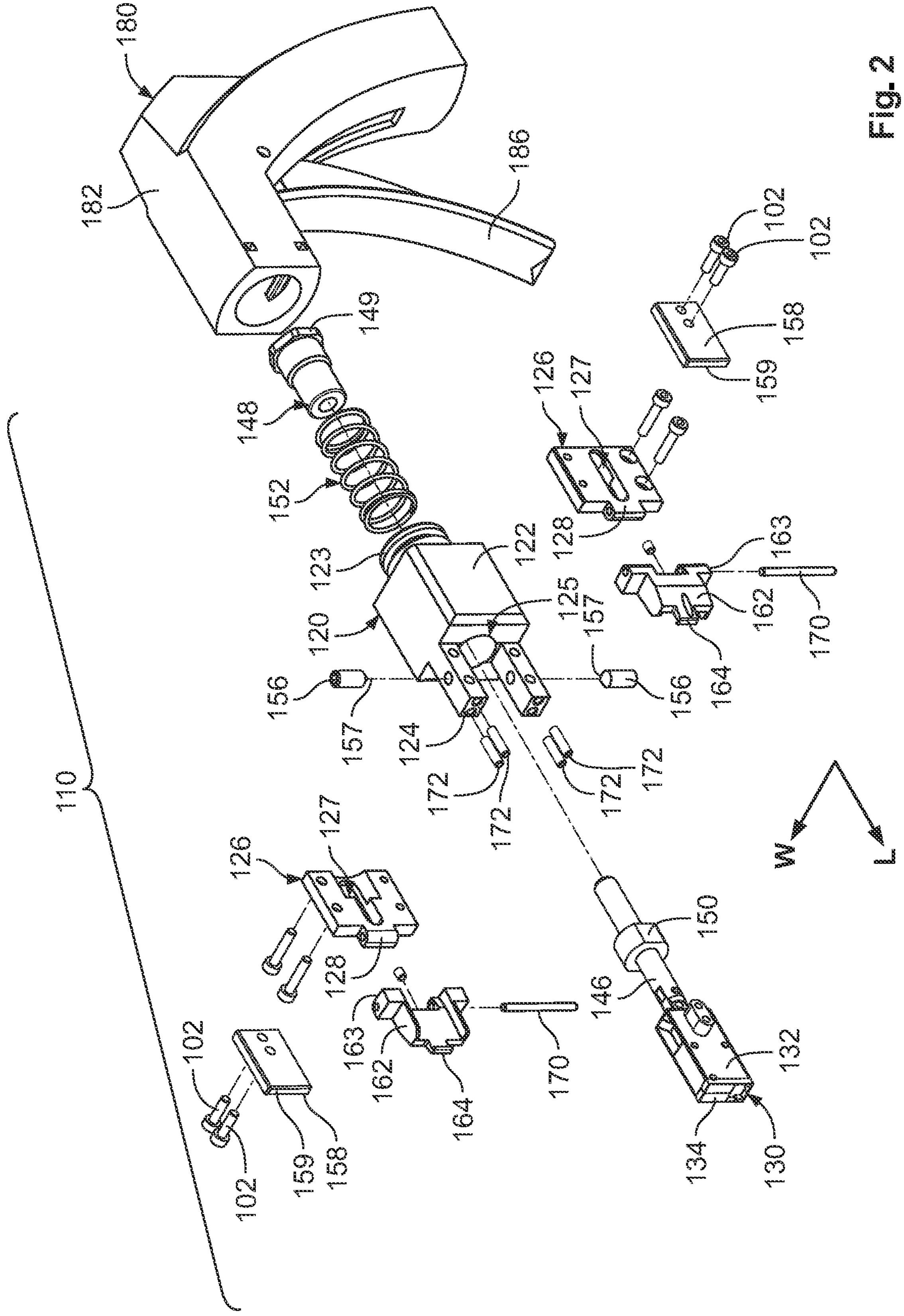
FIG. 2 is an exploded perspective view of a tool of the terminating assembly.
Figure 3:
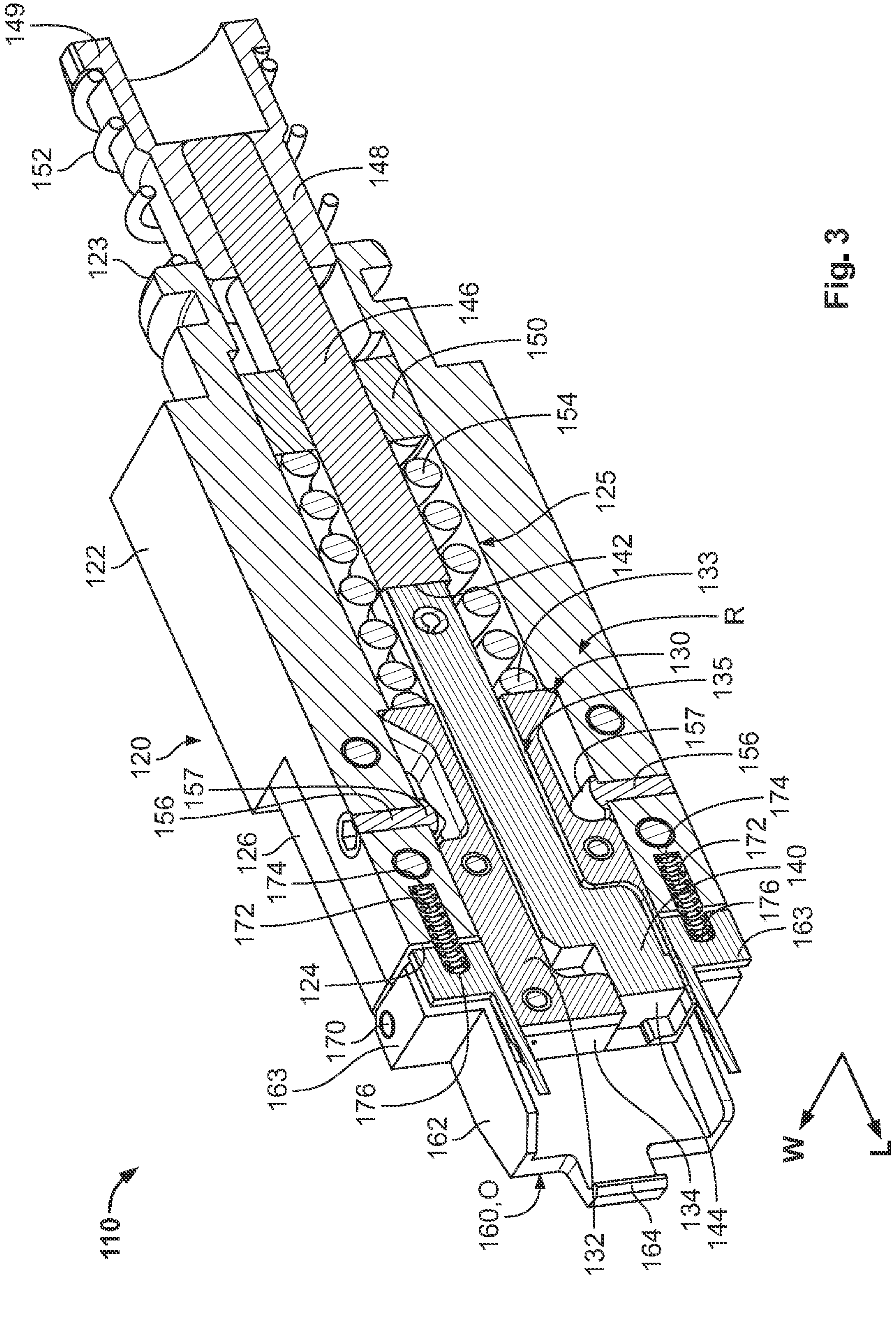
FIG. 3 is a sectional perspective view of a crimp head of the tool.

The tool housing 120, as shown in FIGS. 2 and 3, includes a tool body 122 extending from a first body end 123 to a second body end 124 along a longitudinal direction L. The tool body 122 has a housing passageway 125 extending through the tool body 122 from the first body end 123 to the second body end 124.

As shown in FIGS. 2 and 3, the tool housing 120 has a pair of side plates 126 attached to an outer side of the tool body 122 adjacent to the second body end 124. Each of the side plates 126 has a slot 127 extending through the slide plate 126 in a width direction W perpendicular to the longitudinal direction L. The slot 127 is elongated in the side plate 126 along the longitudinal direction L. Each of the side plates 126 has a hinge 128 at an end of the side plate 126 adjacent to the second body end 124.

The ram assembly 130, as shown in FIGS. 2 and 3, includes a connector ram 132 and a shield ram 134 disposed within the connector ram 132. The connector ram 132 extends from a spring end 133 to a cap end 134 along the longitudinal direction L and has a ram passageway 135 extending through the connector ram 132, as shown in FIG. 3. The ram passageway 135 bends along the longitudinal direction L. The shield ram 140 is disposed within the ram passageway 135 and, between a rear end 142 and a shield end 144 opposite the rear end 142 along the longitudinal direction L, the shield ram 140 has a shape corresponding to the shape of the ram passageway 135, as shown in FIG. 3.

As shown in FIGS. 2 and 3, the ram assembly 130 includes an inserter rod 146 attached to the rear end 142 of the shield ram 140 and extending away from the shield ram 140 along the longitudinal direction L. The ram assembly 130 includes a shield ram adjustor 148 attached to an end of the inserter rod 146 opposite the shield ram 140 and a preload adjustor 150 disposed around the inserter rod 146. The shield ram adjustor 148 is a cylindrical element having a flange 149. The shield ram adjustor 148 is attachable to the end of the inserter rod 146 in a plurality of different positions along the longitudinal direction L; in an embodiment, the shield ram adjustor 148 is attached by a threaded connection to the inserter rod 146 to allow for adjustment of a distance of the flange 149 from the inserter rod 146 along the longitudinal direction L. The preload adjustor 150 is an annular element disposed around the inserter rod 146 and is movable to a plurality of different positions along the inserter rod 146; in an embodiment, the preload adjustor 150 is attached by a threaded connection to the inserter rod 146 to allow for adjustment of a position of the preload adjustor 150 along the longitudinal direction L of the inserter rod 146.

As shown in FIG. 3, the ram assembly 130 is positioned in the housing passageway 125 of the tool body 122. The connector ram 132 and the shield ram 140 disposed within the connector ram 132 are positioned within the housing passageway 125 adjacent to the second body end 124. The inserter rod 146 extends along the housing passageway 125 and the shield ram adjustor 148 connected to the inserter rod 146 is positioned adjacent to the first body end 123 of the tool body 122. The preload adjustor 150 is disposed within the housing passageway 125 and, as shown in FIG. 3, has an outer dimension approximately equal to a diameter of the housing passageway 125.

The ram assembly 130, as shown in FIGS. 2 and 3, includes a return spring 152 disposed between the first body end 123 and the flange 149 of the ram adjustor 148 and a preload spring 154 disposed in the housing passageway 125 between the preload adjustor 150 and the spring end 133 of the connector ram 132.

As shown in FIGS. 2 and 3, the ram assembly 130 includes a plurality of ram stops 156 disposed within the tool housing 120 and extending into the housing passageway 125. The ram stops 156 are each a cylindrical member having a pointed end 157 positioned in the housing passageway 125. In an embodiment, a position of the ram stops 156 with respect to the tool housing 120, and a corresponding protruding distance of the pointed end 157 into the housing passageway 125, is adjustable. In an embodiment, the ram stops 156 are threaded and positioned in a threaded opening of the tool housing 120 to permit adjustment of the positioning of the ram stops 156.

The ram assembly 130 includes a pair of jaw plates 158, shown in FIG. 2. The jaw plates 158 are each an approximately rectangular member extending in the longitudinal direction L and having a leading end 159. The jaw plates 158 are attached to the connector ram 132 by a plurality of fasteners 102 that extend through the slots 127 of the side plates 126. In the shown embodiment, the fasteners 102 are bolts that attach the jaw plates 158 to the connector ram 132. In other embodiments, the fasteners 102 can be any other type of fastening element that can attach the jaw plates 158 to the connector ram 132 and extend through the slots 127 of the side plates 126.

The clamp assembly 160, as shown in FIGS. 1-3, includes a pair of jaws 162 pivotably attached to the tool housing 120. Each of the jaws 162 extends from a pivot end 163 to a hook 164 along the longitudinal direction L. The hook 164 of each of the jaws 162 has an L-shape and bends to extend in the width direction W perpendicular to the longitudinal direction L.

As shown in FIGS. 2 and 3, the clamp assembly 160 includes a pair of pins 170 each attaching one of the jaws 162 to one of the side plates 126 of the tool housing 120. The pins 170 each extend through the pivot end 163 of one of the jaws 162 and the hinge 128 of one of the side plates 126. The jaws 162 are each pivotable about the pin 170 and the hinge 128 of the side plate 126.

The clamp assembly 160, as shown in FIGS. 2 and 3, includes a plurality of biasing springs 172. As shown in FIG. 3, the biasing springs 172 each have a first end 174 and a second end 176 opposite the first end 174 along the longitudinal direction L. The first end 174 of each of the springs 172 is disposed in the second body end 124 of the tool body 122. The second end 176 of each of the springs 172 is disposed in the pivot end 163 of one of the jaws 162.

Figure 4:
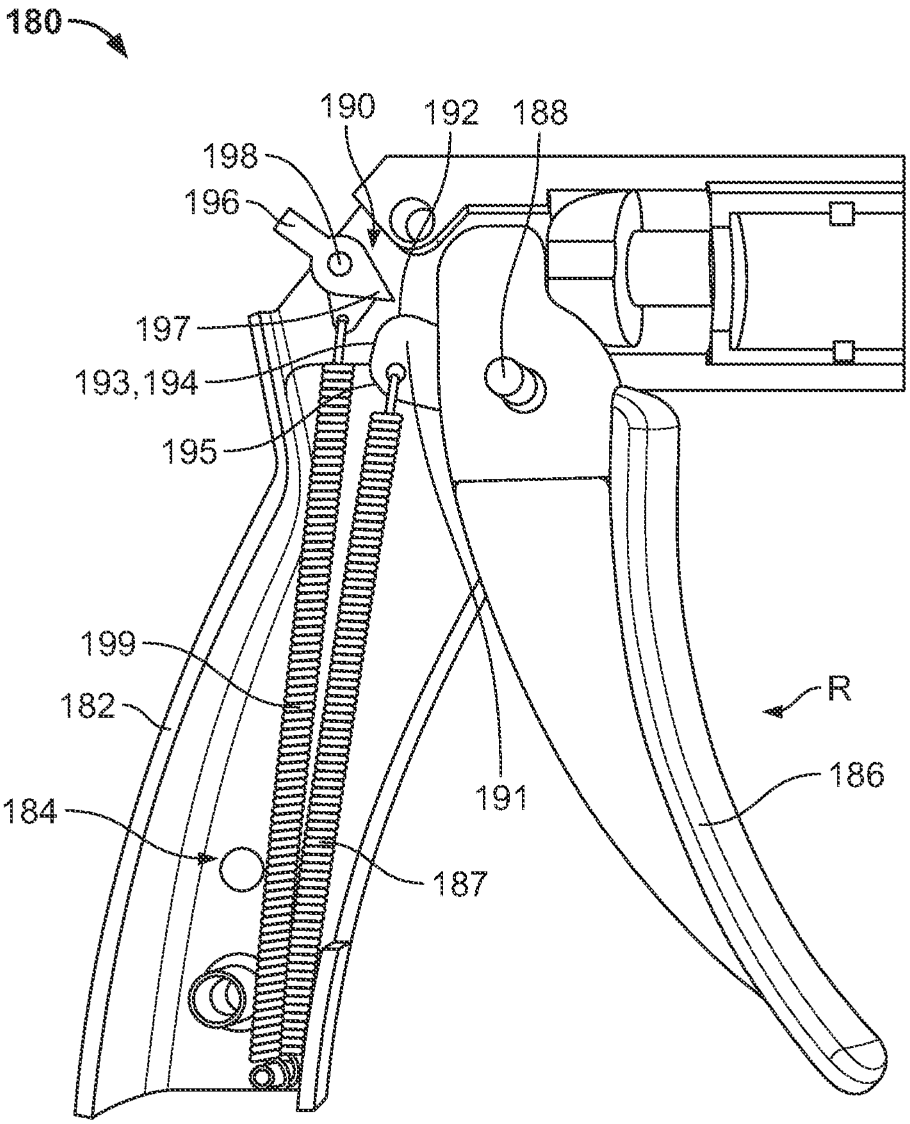
FIG. 4 is a side view of a driving portion of the tool with a portion of a handle removed.

The driving portion 180, in the embodiment shown in FIGS. 1 and 2, has a handle 182 and a trigger 186 disposed within the handle 182 that is movable within the handle 182. As shown in FIG. 4, the handle 182 has a handle passageway 184 in which the trigger 186 is partially disposed. The trigger 186 is pivotable about a trigger axis 188 positioned in the handle passageway 184.

Movement of the trigger 186, for example by manual actuation from a user, pivots the trigger 186 about the trigger axis 188; movement of the trigger 186 with respect to the handle 182 drives movement of the ram assembly 130 of the crimp head 110, as described in greater detail below. The handle 182 and the trigger 186 manually actuated by a user, however, are only one embodiment of the driving portion 180. In other embodiments, the driving portion 180 may be an arbor press, a pneumatic hand tool, or any other element capable of actuating the ram assembly 130 as described herein.

In the embodiment shown in FIG. 4, the driving portion 180 has a ratchet assembly 190 that restricts pivoting of the trigger 186 about the trigger axis 188 in certain positions. The ratchet assembly 190 includes a ratchet tab 191 extending from the trigger 186. On a side distal from the trigger 186, the ratchet tab 191 has a first sloped side 192, a central surface 193 extending from the first sloped side 192, and a second sloped side 195 extending from a side of the central surface 193 opposite the first sloped side 192. The central surface 193 has a plurality of teeth 194. A trigger spring 187 is connected to the ratchet tab 191 and biases the trigger 186 to a retracted position R about the trigger axis 188 shown in FIG. 4.

As shown in FIG. 4, the ratchet assembly 190 includes a pawl 196 attached to the handle 182 in the handle passageway 184. The pawl 196 is pivotable about a pawl axis 198 and has a point 197 at an end of the pawl 196. A pawl spring 199 connected to the pawl 196 biases the pawl 196 into a position about the pawl axis 198 in which the point 197 is adjacent to the ratchet tab 191.

Figure 5:
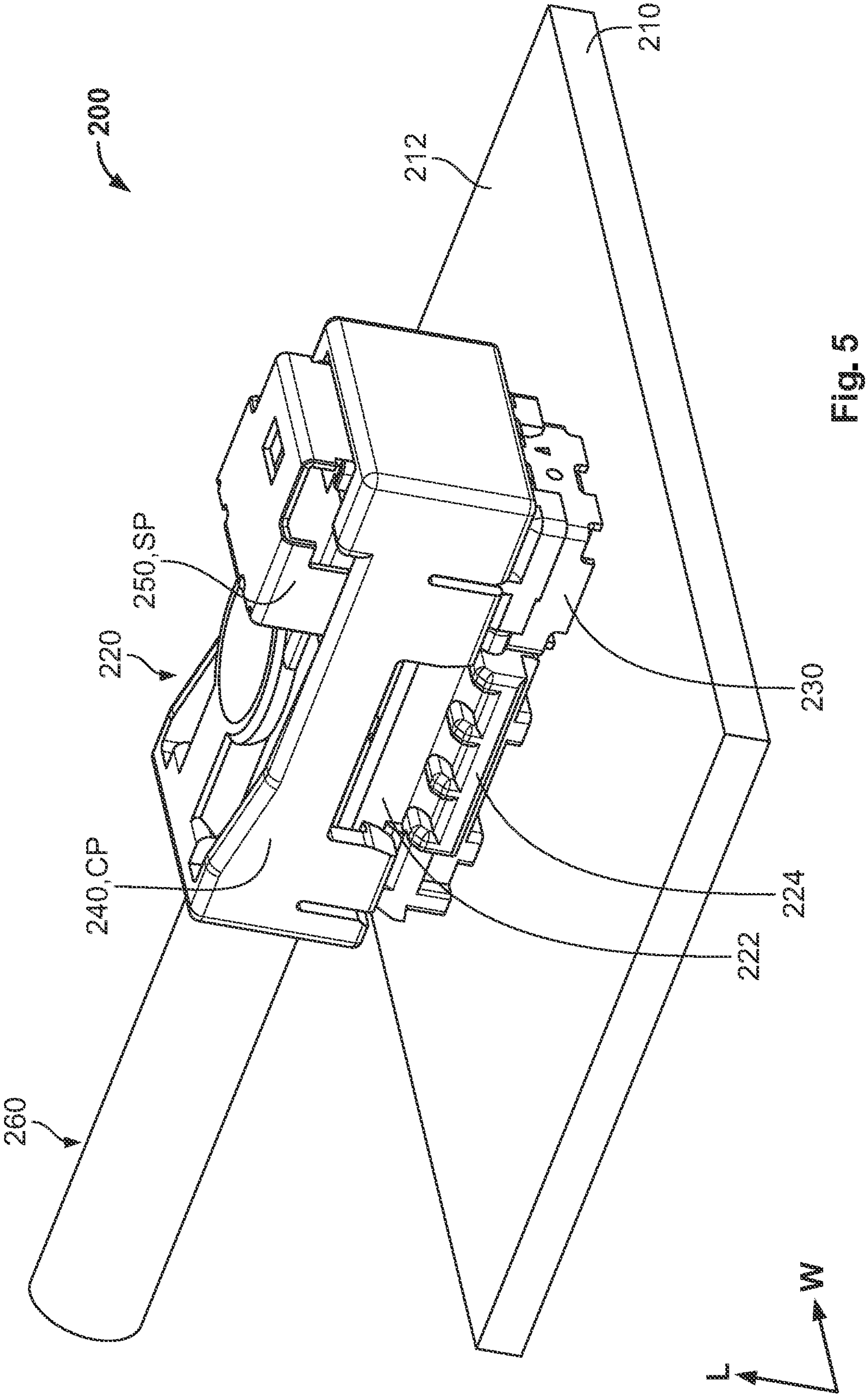
FIG. 5 is a perspective view of a connector assembly of the terminating assembly.
Figure 6:
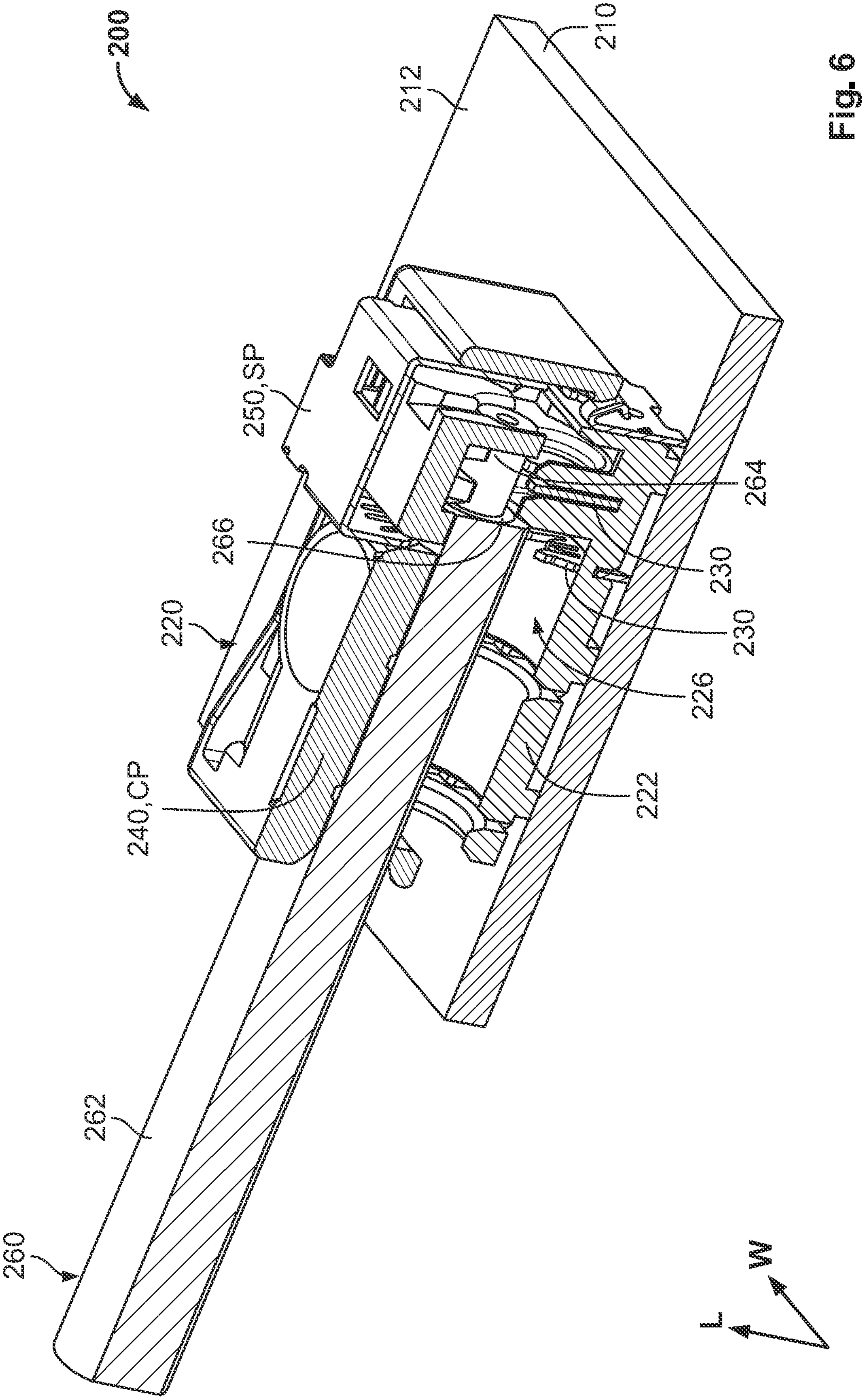
FIG. 6 is a sectional perspective view of the connector assembly.

The connector assembly 200 is shown in detail in FIGS. 5 and 6. The connector assembly 200 includes a printed circuit board 210 (hereinafter, "PCB"), a connector 220 disposed on the PCB 210, and a wire 260 connected to the PCB 210 by the connector 220.

The connector 220, as shown in FIGS. 5 and 6, has a connector housing 222, a contact 230 disposed in the connector housing 222, a cap 240 disposed on the connector housing 222, and a shield 250 disposed on the connector housing 222.

As shown in FIG. 5, the connector housing 222 is attached to an upper surface 212 of the PCB 210 and, as shown in FIG. 6, defines a receiving space 226 within the connector housing 222. The connector housing 222 has a pair of projections 224 extending from the connector housing 222 in the width direction W. The projections 224 extend approximately parallel to the upper surface 212 of the PCB 210 and are spaced apart from the upper surface 212 in the longitudinal direction L, as shown in FIG. 5. In an embodiment, the connector housing 222 is monolithically formed in a single piece of insulative material with the projections 224.

The contact 230, as shown in FIG. 6, is disposed in the connector housing 222 and protrudes into the receiving space 226. The contact 230 is formed of a conductive material and, in the shown embodiment, is an insulation displacement contact.

The cap 240 is shown in a cap protruding position CP on the connector housing 222 in FIGS. 5 and 6. In the cap protruding position CP, the cap 240 is spaced apart from the upper surface 212 of the PCB 210 in the longitudinal direction L. The wire 260 is disposed within the receiving space 226 of the connector housing 222 under the cap 240 and, in the cap protruding position CP, the wire 260 is spaced apart from the contact 230 disposed in the connector housing 222. The wire 260 includes an insulation 262 disposed around a conductor 264 and a shield layer 266 disposed between the insulation 262 and the conductor 264.

The shield 250 is shown in a shield protruding position SP on the connector housing 222 in FIGS. 5 and 6. In the shield protruding position SP, the shield 250 is spaced apart from a portion of the cap 240 and spaced apart from the wire 260 along the longitudinal direction L.

A process of using the tool 100 to terminate the connector assembly 200 will now be described in greater detail primarily with reference to FIGS. 7A-11. The connector assembly 200 begins with the cap 240 in the cap protruding position CP and the shield 250 in the shield protruding position SP, as shown in FIGS. 5 and 6.

Figure 7B:
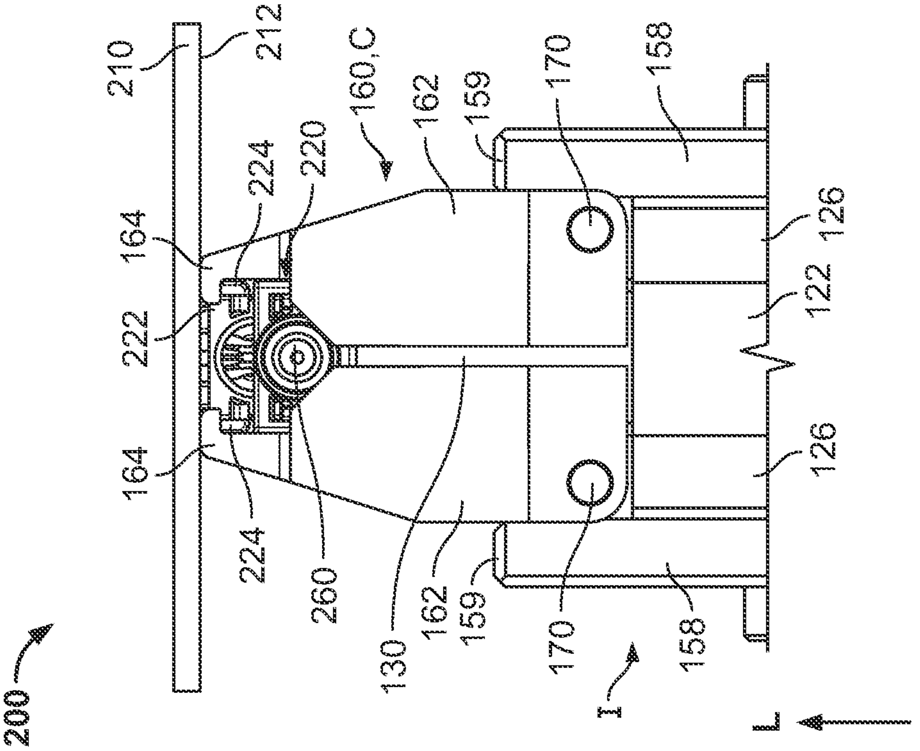
FIG. 7B is a plan view of the terminating assembly with the clamp assembly in a closed position.
Figure 7A:
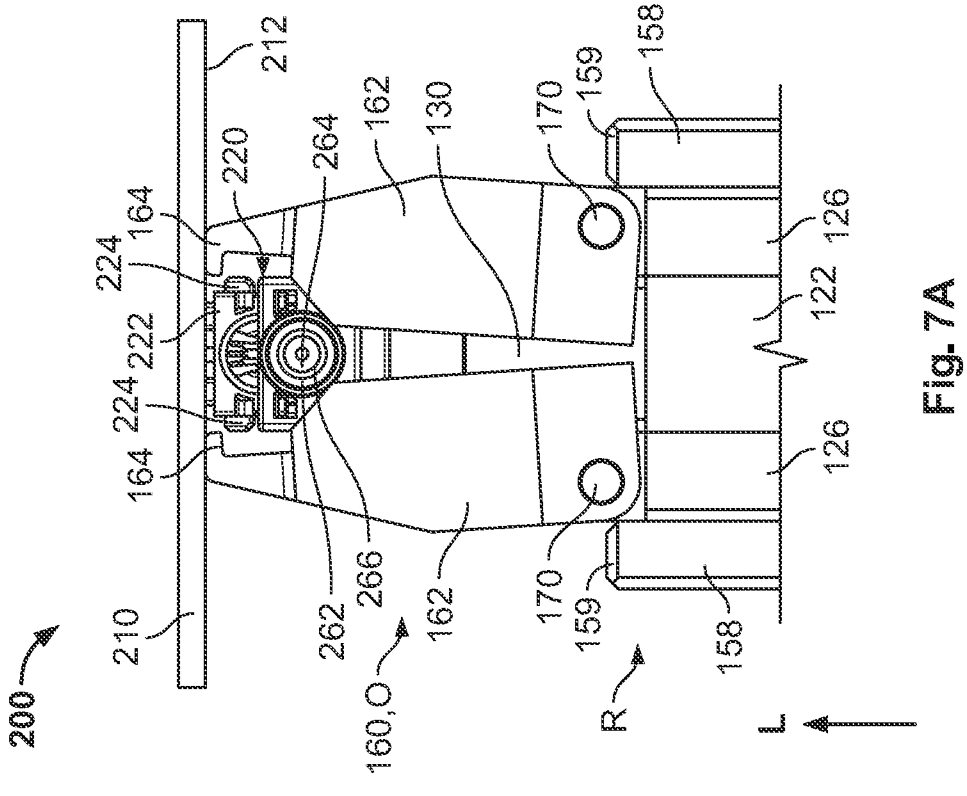
FIG. 7A is a plan view of the terminating assembly with a clamp assembly of the tool in an open position.

The tool 100 starts in the retracted position R shown in FIGS. 1 and 7A. In the retracted position R, the jaws 162 of the clamp assembly 160 are in an open position O. As shown in FIG. 3, the biasing springs 172 bias the jaws 162 toward the open position O, providing a biasing force that pivots the jaws 162 about the pins 170 away from the second body end 124 of the tool body 122. The ram assembly 130 is positioned in the tool housing 120 as shown in FIG. 3 in the retracted position R, with the leading ends 159 of the jaw plates 158, as shown in FIG. 7A, aligned with the pins 170 and the hinges 128 of the side plates 126 along the longitudinal direction L.

With the jaws 162 in the open position O and the driving portion 180 and the ram assembly 130 in the retracted position R, the tool 100 is moved toward the connector assembly 200 along the longitudinal direction L as shown in FIG. 7A. The tool 100 is moved along the longitudinal direction L toward the connector 220 and the PCB 210 until the hooks 164 of the jaws 162 pass beyond the projections 224 of the connector housing 222 in the longitudinal direction L.

Figure 8:
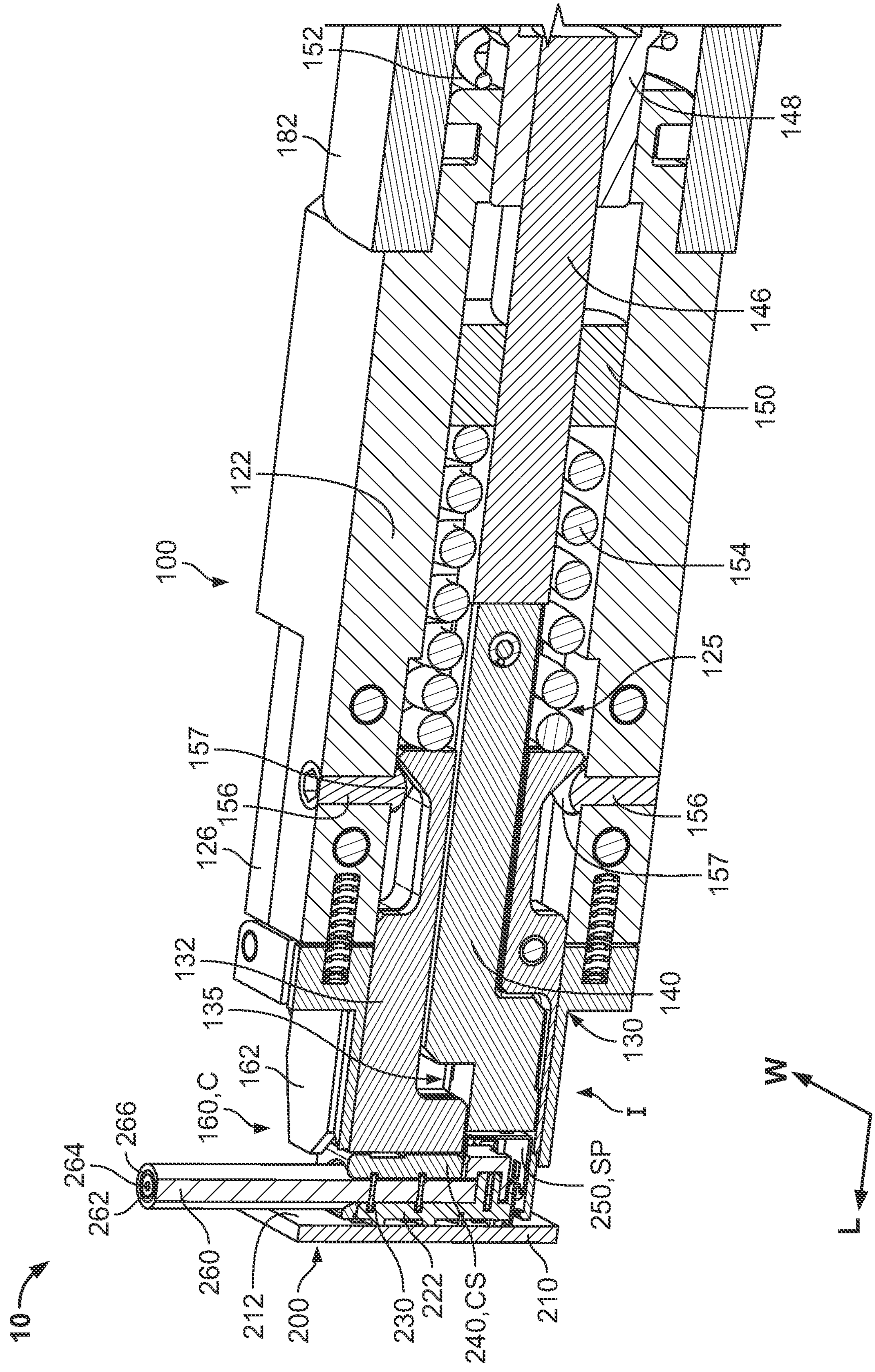
FIG. 8 is a sectional perspective view of the terminating assembly with a ram assembly of the tool in an intermediate position.

The driving portion 180 is then actuated to move the ram assembly 130 from the retracted position R shown in FIG. 7A to an intermediate position I shown in FIGS. 7B and 8. From the retracted position R to the intermediate position I, as shown for example by comparison of FIG. 3 to FIG. 8, the shield ram adjustor 148 moves along the longitudinal direction L under a force from the driving portion 180. To move the ram assembly 130 out of the retracted position R, the force applied by the driving portion 180 must overcome a spring force of the return spring 152, moving the shield ram adjustor 148 toward the first body end 123 of the tool body 122 along the longitudinal direction L. The return spring 152 biases the ram assembly 130 toward the retracted position R.

Movement of the shield ram adjustor 148 along the longitudinal direction L correspondingly moves the inserter rod 146 along the longitudinal direction L. From the retracted position R shown in FIG. 3 to the intermediate position I shown in FIG. 8, the preload spring 154 remains in an extended state; movement of the inserter rod 146 along the longitudinal direction L correspondingly moves the connector ram 132 and the shield ram 140 along the longitudinal direction L in the tool body 122 to the intermediate position I.

As the ram assembly 130 moves along the longitudinal direction L in the tool housing 120, the jaw plates 158 connected to the connector ram 132 likewise move along the longitudinal direction L outside the side plates 126 of the tool housing 120. The fasteners 102 that connect the jaw plates 158 to the connector ram 132 move within the slots 127 of the side plates 126 as the connector ram 132 moves along the longitudinal direction L. As shown in FIG. 7B, as the connector ram 132 moves toward the intermediate position I, the leading ends 159 of the jaw plates 158 abut the outer surfaces of the jaws 162 and move along the jaws 162 in the longitudinal direction L, pivoting the jaws 162 about the pins 170 against the bias of the biasing springs 172.

In the intermediate position I shown in FIG. 7B, the jaw plates 158 have moved along the jaws 162 in the longitudinal direction L to pivot the jaws 162 and the clamp assembly 160 from the open position O to a closed position C. In the closed position C, the jaws 162 engage the connector housing 222, with the hook 164 of each of the jaws 162 engaging one of the projections 224 of the connector housing 222. The hook 164 of each of the jaws 162 is disposed between one of the pair of projections 224 and the upper surface 212 of the PCB 210; the jaws 162 bear on the connector housing 222 via the projections 224 in the closed position C.

Figure 11:
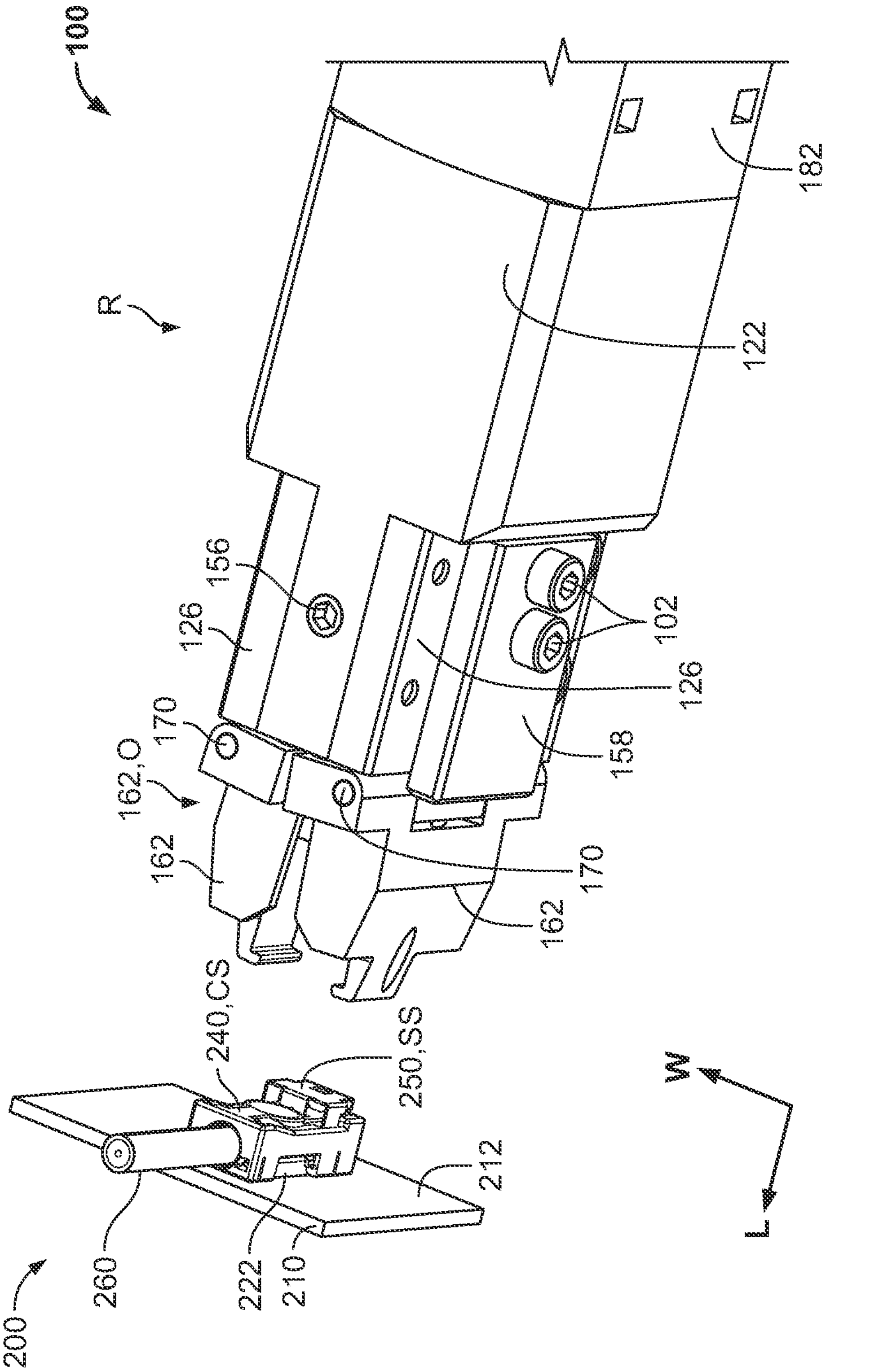
FIG. 11 is a perspective view of the tool and the connector assembly after termination of the connector assembly.

As shown in FIG. 8, with the jaws 162 engaged with the connector housing 222, the connector ram 132 reaches the intermediate position I and presses the cap 240 toward the connector housing 222 from the cap protruding position CP to a cap seated position CS on the connector housing 222. In the movement toward the intermediate position I, the cap end 134 of the connector ram 132 contacts the cap 140 and, as the connector ram 132 continues to move along the longitudinal direction L toward the intermediate position I, the connector ram 132 presses the cap 240 to the cap seated position CS. In moving to the cap seated position CS, the cap 240 presses the wire 260 into the contact 230, terminating the wire 260 to the contact 230; the contact 230 pierces through the insulation 262 of the wire 260 and electrically connects with the conductor 262 of the wire 260. As shown in FIG. 11, the cap 140 abuts the upper surface 212 of the PCB 210 in the cap seated position CS.

When the connector ram 132 reaches the intermediate position I shown in FIG. 8 in which the cap 140 is fully seated in the cap seated position CS, the connector ram 132 abuts the pointed ends 157 of the ram stops 156 that protrude into the housing passageway 125. The ram stops 156 prevent the connector ram 132 from moving further along the longitudinal direction L toward the connector assembly 200 from the intermediate position I, preventing excessive force on the cap 140 and overcompression of the cap 140 on the connector housing 222.

Figure 9:
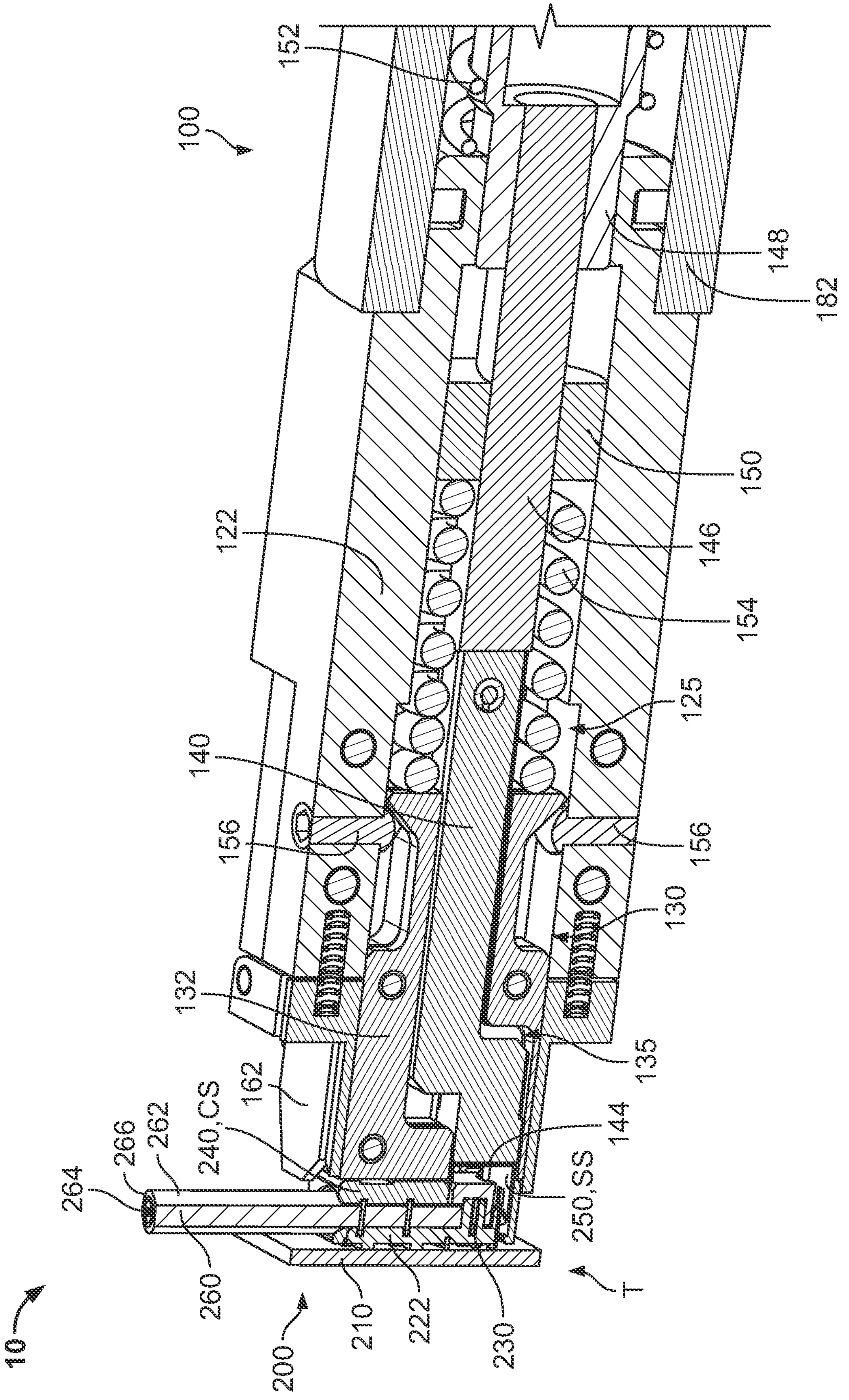
FIG. 9 is a sectional perspective view of the terminating assembly with the ram assembly in a terminated position.

Continued actuation of the driving portion 180 moves the ram assembly 130 from the intermediate position I shown in FIG. 8 to a terminated position T shown in FIG. 9. The jaws 162 remain engaged with the connector housing 122 as the ram assembly 130 moves from the intermediate position I to the terminated position T. Because the connector ram 132 abuts the ram stops 156, continued force from the driving portion 180 that is greater than a preload force of the preload spring 154 moves the shield ram 140 within the ram passageway 135 of the connector ram 132 along the longitudinal direction L. The connector ram 132 remains in a same position in the tool housing 120 along the longitudinal direction L as the shield ram 140 moves from the intermediate position I to the terminated position T.

As the shield ram 140 moves along the longitudinal direction L within the ram passageway 135 to the terminated position T shown in FIG. 9, the shield end 144 of the shield ram 140 contacts the shield 250 and presses the shield 250 to a shield seated position SS on the connector housing 222. In the shield seated position SS, the shield 250 pierces the insulation 262 of the wire 260 and electrically contacts the shield layer 266 of the wire 260. When the ram assembly 130 reaches the terminated position T, the wire 260 is fully terminated in the connector 220 and the connector 220 electrically connects the wire 260 to the PCB 210.

In the shown embodiment, the ratchet assembly 190 of the driving portion 180 restricts movement of the ram assembly 130 back to the retracted position R until the ram assembly 130 reaches the terminated position T. As shown in FIG. 10A, once the ram assembly 130 moves out of the retracted position R under movement of the trigger 186, the point 197 of the pawl 196 engages the teeth 194 on the central surface 193 of the ratchet tab 191. In this position, if the driving force of the driving portion 180 is removed, such as by a user releasing pressure on the trigger 186, the pawl 196 engages the teeth 194 and prevents the trigger 186 from rotating back toward the retracted position R around the trigger axis 188.

Figure 10B:
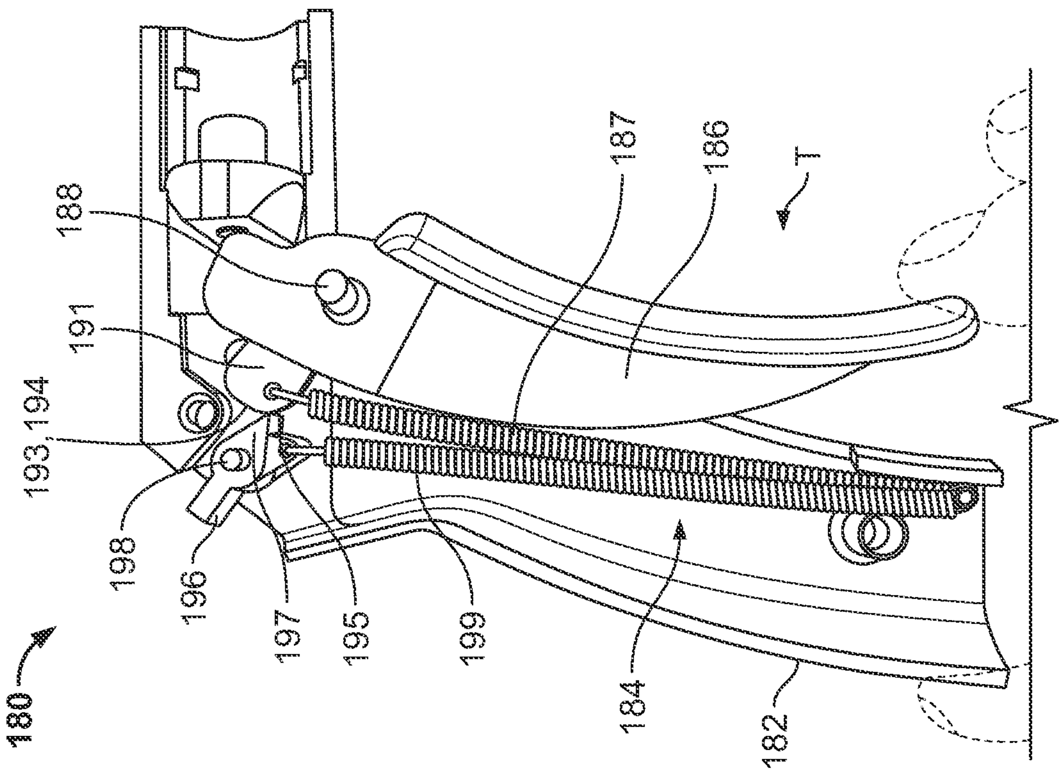
FIG. 10B is a side view of the driving portion with the ratchet assembly in the terminated position.
Figure 10A:
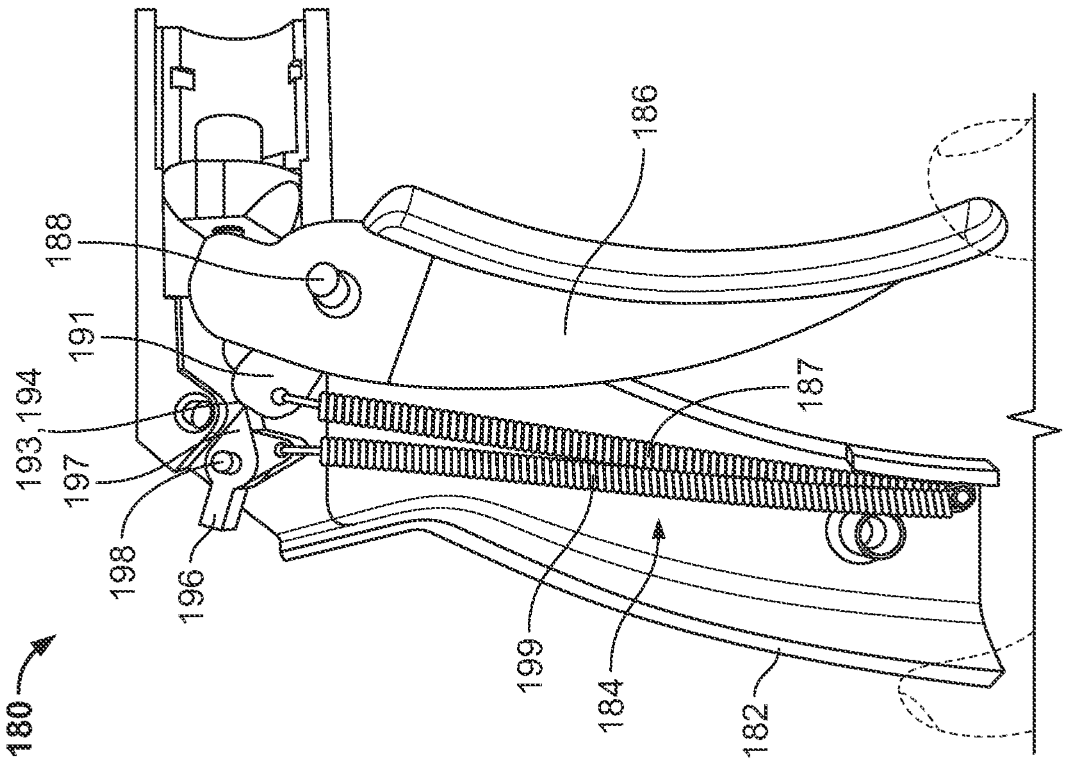
FIG. 10A is a side view of the driving portion with a ratchet assembly and a portion of a handle removed.

When the ram assembly 130 reaches the terminated position T under driving of the driving portion 180, as shown in FIG. 10B, the pawl 196 reaches the second sloped side 195 of the ratchet tab 191. The point 197 of the pawl 196 is no longer engages with the teeth 194 of the central surface 193 in the terminated position T and the trigger 186 is free to rotate back toward the retracted position R about the trigger axis 188.

As shown in FIG. 11, once the ram assembly 130 reaches the terminated position T and the connector assembly 200 is fully terminated, the driving portion 180 releases the driving force and the ram assembly 130 moves back to the retracted position R. With the jaw plates 158 retracted, the biasing springs 172 bias the jaws 162 into the open position O and the tool 100 can be removed from engagement with the connector assembly 200.

The clamp assembly 160 of the tool 100 according to the invention bears on the connector housing 222 while the tool 100 moves the cap 240 to the cap seated position CS and the shield 250 to the shield seated position SS. Bearing on the connector housing 222 avoids transferring force to the PCB 210, which avoids damage to a joint between the connector 220 and the PCB 210 and improves the reliability of the connector assembly 200. The tool 100 also presses the cap 240 and the shield 250 of the connector 220 successively in two stages in one cycle of the driving portion 180, efficiently terminating the wire 260 in the connector 220 while avoiding damage to the connector 220 and the PCB 210.

What is claimed is:

1. A tool for a connector assembly, comprising:

a crimp head having a tool housing and a ram assembly disposed within the tool housing, the ram assembly has a connector ram and a shield ram disposed within the connector ram; and a driving portion driving movement of the ram assembly with respect to the tool housing from a retracted position to a terminated position along a longitudinal direction, the connector ram and the shield ram are movable together with respect to the tool housing from the retracted position to an intermediate position between the retracted position and the terminated position, the shield ram is movable with respect to the connector ram from the intermediate position to the terminated position of the ram assembly.

2. The tool of claim 1, wherein the ram assembly has a ram stop disposed in the tool housing, the connector ram contacts the ram stop in the intermediate position.

3. The tool of claim 2, wherein the ram stop maintains a position of the connector ram along the longitudinal direction as the shield ram moves from the intermediate position to the terminated position.

4. The tool of claim 1, wherein the driving portion has a handle and a trigger movable with respect to the handle to drive movement of the ram assembly.

5. The tool of claim 4, wherein the driving portion has a ratchet assembly restricting movement of the ram assembly back to the retracted position until the ram assembly reaches the terminated position.

6. The tool of claim 1, wherein the crimp head has a clamp assembly including a pair of jaws pivotably attached to the tool housing.

7. The tool of claim 6, wherein the ram assembly has a pair of jaw plates attached to the connector ram and movable with the connector ram, the jaw plates each abut one of the jaws and move the jaws from an open position to a closed position as the connector ram moves from the retracted position to the intermediate position.

8. The tool of claim 7, wherein the clamp assembly has a plurality of biasing springs each having a first end disposed in the tool housing and a second end disposed in one of the jaws, the biasing springs bias the jaws toward the open position.

9. The tool of claim 1, wherein the ram assembly has an inserter rod connected to the shield ram and a shield ram adjustor disposed on an end of the inserter rod opposite the shield ram.

10. The tool of claim 9, wherein the ram assembly has a return spring disposed between the shield ram adjustor and the tool housing, the return spring biases the ram assembly toward the retracted position.

11. The tool of claim 9, wherein the ram assembly has a preload adjustor disposed around the inserter rod and a preload spring disposed between the preload adjustor and the connector ram, the driving portion overcomes a preload force of the preload spring to move the shield ram with respect to the connector ram along the longitudinal direction.

12. A terminating assembly, comprising:

a connector assembly including a connector having a connector housing and a cap disposed on the connector housing; and a tool including a crimp head having a tool housing, a ram assembly disposed within the tool housing, and a clamp assembly attached to the tool housing, the ram assembly is movable with respect to the tool housing along a longitudinal direction between a retracted position and a terminated position, movement of the ram assembly from the retracted position to an intermediate position between the retracted position and the terminated position moves a pair of jaws of the clamp assembly into a closed position of the jaws in engagement with the connector housing and moves the cap to a cap seated position on the connector housing.

13. The terminating assembly of claim 12, wherein the ram assembly includes a connector ram and a shield ram disposed within the connector ram, the connector ram contacts the cap and moves the cap to the cap seated position as the ram assembly moves from the retracted position to the intermediate position.

14. The terminating assembly of claim 12, wherein the connector assembly includes a printed circuit board, the connector is disposed on the printed circuit board.

15. The terminating assembly of claim 14, wherein the connector housing has a pair of projections extending from the connector housing and the jaws each have a hook at an end opposite the tool housing, the hook of each of the jaws engages one of the pair of projections in the closed position.

16. The terminating assembly of claim 15, wherein the hook of each of the jaws is disposed between one of the pair of projections and an upper surface of the printed circuit board in the closed position.

17. The terminating assembly of claim 16, wherein the shield ram moves with respect to the connector ram from the intermediate position to the terminated position.

18. The terminating assembly of claim 17, wherein the connector ram is held by a ram stop in the tool housing at the intermediate position and remains in a same position in the tool housing along the longitudinal direction as the shield ram moves from the intermediate position to the terminated position.

19. The terminating assembly of claim 17, wherein the connector assembly includes a shield disposed on the connector housing, the shield ram contacts the shield and moves the shield to a shield seated position on the connector housing as the shield ram moves from the intermediate position to the terminated position.

20. The terminating assembly of claim 19, wherein the jaws are in the closed position in engagement with the connector housing in the intermediate position and in the terminated position.

* * * * *